Sept. 7, 1926. 1,598,892
A. F. STUEBING
DRAFT GEAR
Filed June 3, 1925 2 Sheets-Sheet 2
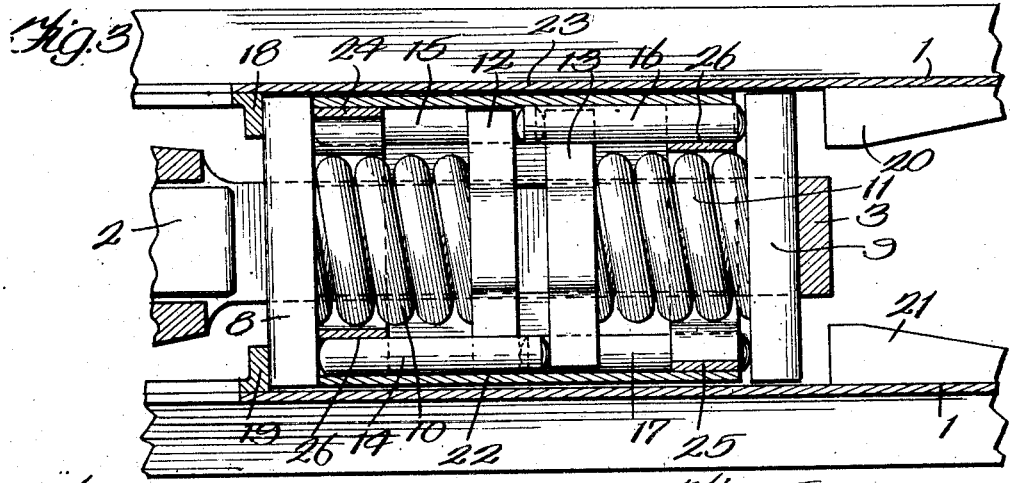
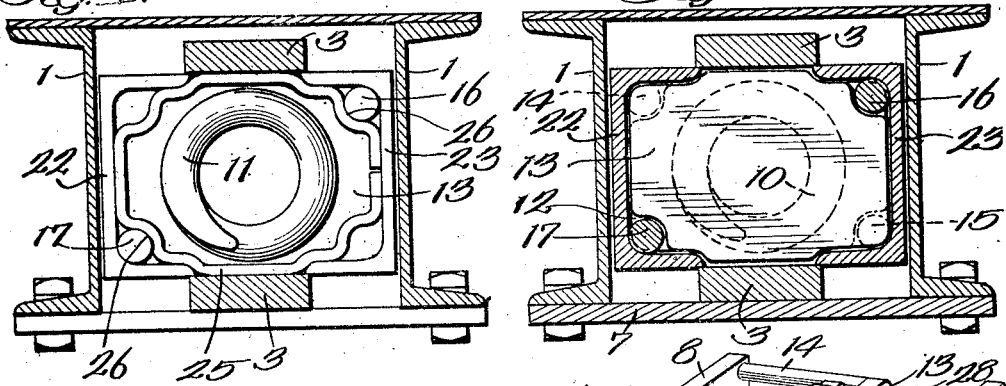
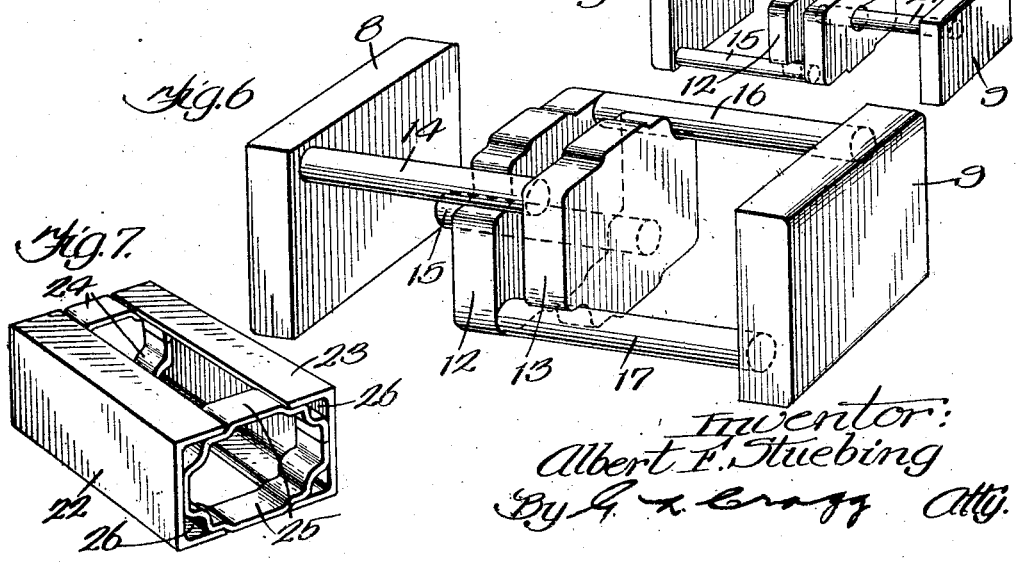
Inventor:
Albert F. Stuebing Patented Sept. 7, 1926.

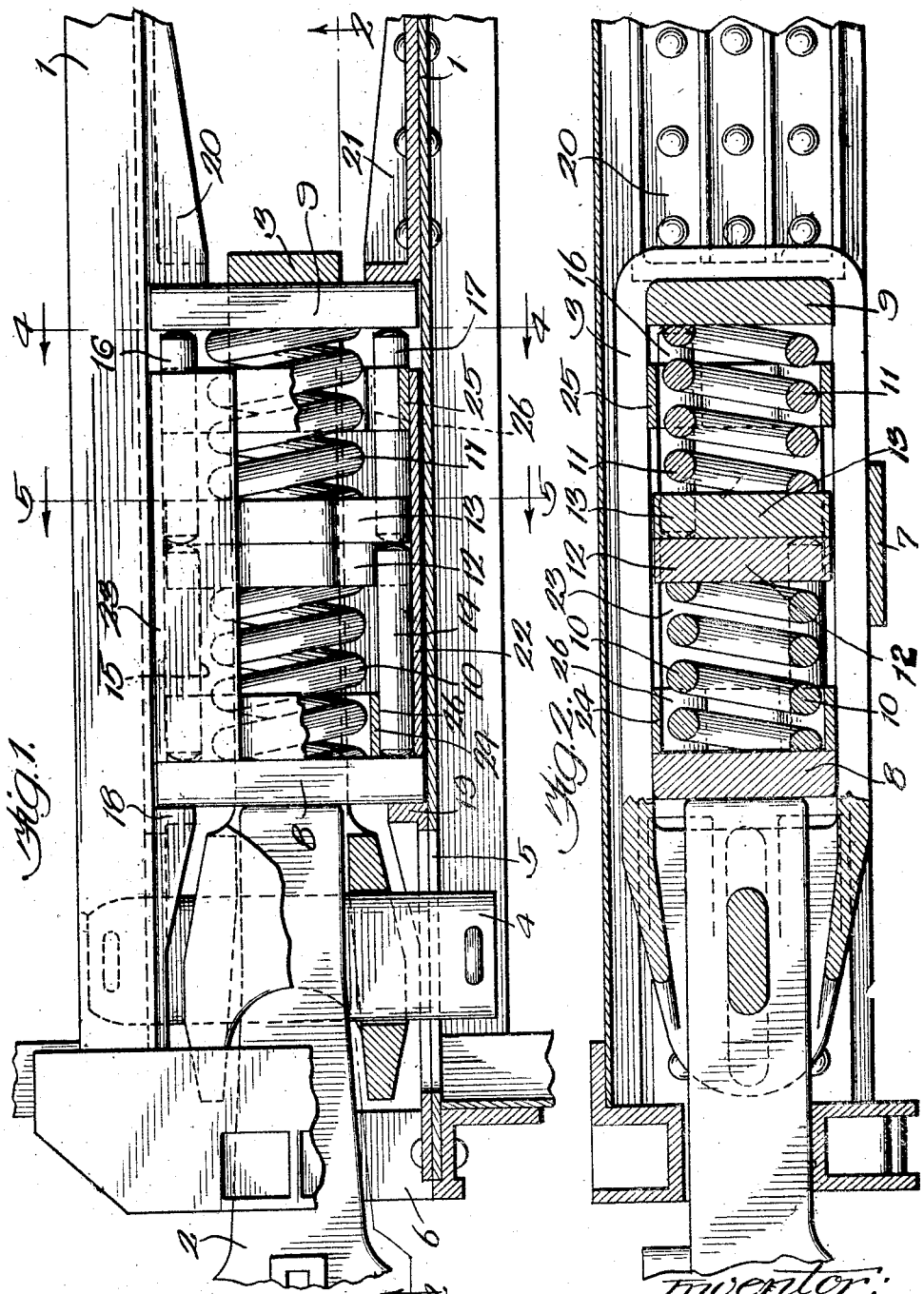

1,598,892

UNITED STATES PATENT OFFICE.

ALBERT F. STUEBING, OF NEW YORK, N. Y., ASSIGNOR TO THE BRADFORD PATENTS CORPORATION, OF NEW YORK, N. Y., A CORPORATION OF DELAWARE.

DRAFT GEAR.

Application filed June 3, 1925. Serial No. 34,535.

My invention relates to draft gears of the type employing springs in the line of draft and provided with floating abutments between the springs, and means traversing each abutment for transmitting draft strains to the other.

My invention has for its object the general improvement in the construction of such gears and an arrangement whereby the draft strain transmitting means engaging the abutments may be accommodated without increasing the space required between the yoke sides and between the draft sills containing the gear.

Draft gears constructed in accordance with my invention are inclusive of draft strain transmitting rods. These rods preferably float, in which case housings are provided to guide them in their movements and to retain them in proper relation with the gear elements operating thereupon and operated thereby.

In the preferred embodiment of the invention, inner and outer followers are employed, the springs being interposed between these followers and the floating abutments that are between the adjacent ends of the springs. Draft strain transmitting rods intervene between the follower pertaining to each spring and the abutment pertaining to the other spring and crossing or traversing the abutment pertaining to the first spring for this purpose. Each spring is embraced by two draft transmitting rods and in order that the draft gear space may be economized, each pair of rods is arranged in an oblique plane that contains the axis of the springs, the oblique planes in which both pairs of rods are disposed being themselves in angular relation.

The invention will be more fully explained in connection with the accompanying drawings in which Fig. 1 is a plan view partially in section of a draft gear constructed in accordance wth the preferred embodiment of the invention; Fig. 2 is a sectional view on line 2—2 of Fig. 1; Fig. 3 is a plan view, partially in section, of a part of the structure shown in Fig. 1, with portions in changed positions; Fig. 4 is a sectional view on line 4—4 of Fig. 1; Fig. 5 is a sectional view on line 5—5 of Fig. 1; Fig. 6 is a perspective view illustrating the preferred embodiment of followers, abutments, and draft strain transmitting rods; Fig. 7 is a perspective view illustrating the preferred form of housing for guiding the rods and which also desirably serves to limit the extent to which the followers may approach each other; and Fig. 8 illustrates a modification of the arrangement shown in Fig. 6.

The draft sill structure is desirably inclusive of center sills 1. The coupler stem 2 and the coupler yoke 3 are suitably assembled with said sills. In the embodiment of the invention illustrated, the outer end of the coupler yoke and the stem are assembled by a transverse key 4 which passes through elongated horizontal slots 5 provided in the center sills, these slots being of sufficient length to permit the coupler yoke and stem to operate throughout their required range of movement longitudinally of the slots. The key 4 supports the inner end of the coupler stem and the outer end of the coupler yoke upon the sills, the stem being further supported by the bridge piece 6 assembled with the sills while the yoke is further supported by the transverse strap 7 which is bolted to and beneath the sills. Inner and outer followers 8 and 9 are surrounded by the yoke and are supported upon the bottom side of the yoke. Inner and outer coiled springs 10 and 11 are arranged in the line of draft and are respectively engaged by the inner and outer followers. Abutments 12 and 13 are interposed between the opposing or adjacent ends of the springs, abutment 12 being engaged by the spring 10 and the abutment 13 being engaged by the spring 11.

Referring now particularly to the construction illustrated in each of the figures except Fig. 8, two outer rods 14 and 15 have the spring 10 interposed therebetween, these rods being in engagement with the follower 8 pertaining to this spring and the floating abutment 13 which pertains to spring 11, the rods constituting means for preserving the distance between this follower and abutment. There are also provided two inner rods 16 and 17 which are in engagement with the inner follower 9 and between which the inner spring 11 is interposed, these rods 16 and 17 also engaging the floating abutment 12 pertaining to the outer spring 10. Thus each pair of rods embracing one spring crosses and guides the abutment pertaining to this spring into engagement with the abutment pertaining to the other spring.

The draft sills are provided with formations for limiting the outward movement of the outer follower and the inward movement of the inner follower, these formations being desirably in the nature of outer cheek plates 18, 19, and inner cheek plates 20 and 21 that are riveted to the center sills. The extent to which the followers may approach one another is limited by a rod enclosing housing including a pair of plates 22 and 23 that are desirably bent into channel form with channels facing each other. The ends of these plates embrace supplemental housing portions in the form of straps 24 and 25 which are shaped to define with the corner portions of the aforesaid plates four channel ways 26 in which the rods 14, 15, 16 and 17 slide and are guided. By this arrangement one pair of rods 14, 15 is contained in an oblique plane which is inclusive of the axis of the spring 10, and the other pair of rods 16, 17 is included in another oblique plane angular to the first, and which is inclusive of the axis of the spring 11. That is, one pair of rods is arranged upon one diagonal and the other upon another diagonal. The rods are thus placed where there is the maximum space between the coiled springs and the surrounding portions of the gear.

The structure shown in Fig. 8 possesses elements similar to those in the other figures, similar parts being given similar characters of reference. There is but one pair of rods, 14, 15, however, in this construction, the other pair of rods being replaced by the single rod 27 which would be coaxial with the spring 11 and which traverses the abutment 13 through a central hole 28 formed in this abutment, this single rod engaging the abutment 12 to perform the function of the two rods 16 and 17.

Having thus described my invention I claim:—

1. A draft gear including inner and outer followers, springs in the line of draft, each follower having a spring individual thereto; abutments between the opposed ends of said springs, one engaged by one of these spring ends and the other by the other of said spring ends; two rods between which one spring is disposed and constituting distance preserving means between the follower pertaining to this spring and the abutment pertaining to the other spring; distance preserving means between the other follower and abutment; plates interposed between said followers to limit the extent to which they may approach each other; and a strap forming with said plates channel ways guiding said rods.

2. A draft gear including inner and outer springs arranged in the line of draft; floating abutments between the opposed ends of said springs, one engaged by one of said spring ends and the other by the other of said spring ends; two draft strain transmitting floating rods engaging one abutment and between which the spring pertaining to the other abutment is disposed; draft strain transmitting means engaging the other abutment; and a housing for said rods which guides them in their movements.

In witness whereof, I hereunto subscribe my name.

ALBERT F. STUEBING.